(12) United States Patent
Najera et al.

(10) Patent No.: US 6,622,489 B1
(45) Date of Patent: Sep. 23, 2003

(54) INTEGRATED GAS BOOSTER MODULATION CONTROL METHOD

(75) Inventors: Lorenzo Najera, Rio Rancho, NM (US); Brian Finstad, Albuquerque, NM (US); Richard Annati, Albuquerque, NM (US)

(73) Assignee: Hybrid Power Generation Systems, LLC, Los Angeles, CA (US)

( * ) Notice: Subject to any disclaimer, the term of this patent is extended or adjusted under 35 U.S.C. 154(b) by 0 days.

(21) Appl. No.: 09/696,649

(22) Filed: Oct. 25, 2000

(51) Int. Cl.$^7$ ................................................. F02C 3/22
(52) U.S. Cl. ..................... 60/773; 60/39.281; 417/295
(58) Field of Search ...................... 60/773, 39.281, 60/39.465, 734; 417/295

(56) References Cited

U.S. PATENT DOCUMENTS

| | | | |
|---|---|---|---|
| 4,087,961 A | | 5/1978 | Avery |
| 4,598,542 A | | 7/1986 | Reynolds |
| 4,608,820 A | | 9/1986 | White et al. |
| 4,716,719 A | * | 1/1988 | Takahashi et al. ....... 60/39.281 |
| 4,922,710 A | | 5/1990 | Rowen et al. |
| 5,274,996 A | | 1/1994 | Goff et al. |
| 5,305,597 A | | 4/1994 | Snow |
| 5,606,853 A | | 3/1997 | Birch et al. |
| 5,609,016 A | * | 3/1997 | Yamada et al. .......... 60/39.281 |
| 5,855,112 A | | 1/1999 | Bannai et al. |
| 6,070,404 A | | 6/2000 | Bosley et al. |
| 6,293,766 B1 | * | 9/2001 | Blotenberg ................. 417/295 |

FOREIGN PATENT DOCUMENTS

WO     WO97/09524     3/1997

\* cited by examiner

*Primary Examiner*—Michael Koczo
(74) *Attorney, Agent, or Firm*—Sutherland Asbill & Brennan LLP

(57) ABSTRACT

A method of controlling a gas booster comprises computing in an engine control unit a reference discharge pressure for the gas booster. In the engine control unit, an actual discharge pressure of the gas booster and the reference discharge pressure are compared. The engine control unit generates a correcting signal derived from the step of comparing. The engine control unit sends the correcting signal to an inlet valve in flow communication with the gas booster. The inlet valve is adjusted in response to the correcting signal. It is emphasized that this abstract is provided to comply with the rules requiring an abstract that will allow a searcher or other reader to ascertain quickly the subject matter of the technical disclosure. The abstract is submitted with the understanding that it will not be used to interpret or limit the scope or meaning of the claims.

20 Claims, 2 Drawing Sheets

INTEGRATED GAS BOOSTER MODULATION CONTROL METHOD

BACKGROUND OF THE INVENTION

The present invention generally relates to gas boosters and, more particularly, to and apparatus and integrated method of modulating a gas booster based upon feedback control of an effective suction flow area of the gas booster.

Gas boosters are used to compress and thereby boost the pressure of the fuel gas that is eventually fed to a turbine engine. Commonly, a metering or control valve is intermediate the gas booster and turbine. The metering valve regulates the amount of fuel into the turbine. Thus, when the turbine is accelerated or decelerated, the metering valve is correspondingly opened or closed.

Previous designs have used a pressure transducer to monitor pressure downstream of the gas booster in order to regulate the metering valve downstream of the gas booster. For example, U.S. Pat. No. 4,087,961 discloses a boost compressor, a pressure regulator downstream of the boost compressor, and a pressure transducer and metering valve downstream of the pressure regulator. A speed governor utilizes the inlet pressure from the pressure regulator and a discharge pressure from the turbine to open or close the metering valve. In turn, the rate of fuel flow into the turbine is controlled.

U.S. Pat. No. 5,305,597 also regulates gas flow at a point downstream of a gas booster and upstream of a turbine. A pressure regulator maintains a constant differential pressure across a metering valve. A mass flow meter is downstream of the metering valve. The metering valve, resolver, and mass flow meter cooperate with an electronic control circuit to generate a feedback signal indicative of the mass fuel flow.

In an effort to reduce the costs associated with using a gas booster, U.S. Pat. No. 4,922,710 attempts to lower the power requirements for the gas booster. A complex series of metering valves downstream of the gas booster minimize pressure drops prior to the turbine.

However, the above past designs do not address fuel control upstream of or at the gas booster. Moreover, the foregoing past designs do not endeavor to provide booster suction control. Yet, gas boosters need an efficient means of compression. The power consumed by the compression process is a function of the fuel delivery rate and the pressure ratio. Therefore, the discharge pressure, or the booster's ability to deliver fuel at a desired discharge pressure is a primary factor in efficiency. The booster discharge pressure must be high enough to overcome the pressure drops required to meter fuel to satisfy the system needs. Yet, fuel delivered at pressures excessively beyond the system requirements translates into energy wasted.

As can be seen, there is a need for an apparatus and method of regulating the gas delivered to a gas booster. Another need is for an apparatus and method of fuel control upstream of or at the gas booster to provide booster suction control. A further need is for an apparatus and method that improves the efficiency of a gas booster by employing a feedback signal to regulate the delivery of gas to the booster.

In addressing the above needs, the present invention provides in one aspect a method of controlling a gas booster, comprising computing in an engine control unit a reference discharge pressure for the gas booster; comparing in the engine control unit an actual discharge pressure of the gas booster and the reference discharge pressure; generating from the engine control unit a correcting signal derived from the step of comparing; sending from the engine control unit the correcting signal to an inlet valve in flow communication with the gas booster; and adjusting the inlet valve in response to the correcting signal.

In another aspect of the present invention, an apparatus for controlling a gas booster that is used to raise commonly low site pressures of 0.25 to 15 psig to a pressure usable by a turbine engine fuel delivery system comprises a first signal loop having an engine control unit and a receiver of the gas booster, with the said engine control unit being responsive to an actual discharge pressure signal from the receiver; and a second signal loop having the engine control unit and an effective suction flow area of the gas booster, with the effective suction flow area being responsive to a correcting signal from the engine control unit.

These and other features, aspects and advantages of the present invention will become better understood with reference to the following drawings, description and claims.

DETAILED DESCRIPTION OF THE INVENTION

Figure 1:
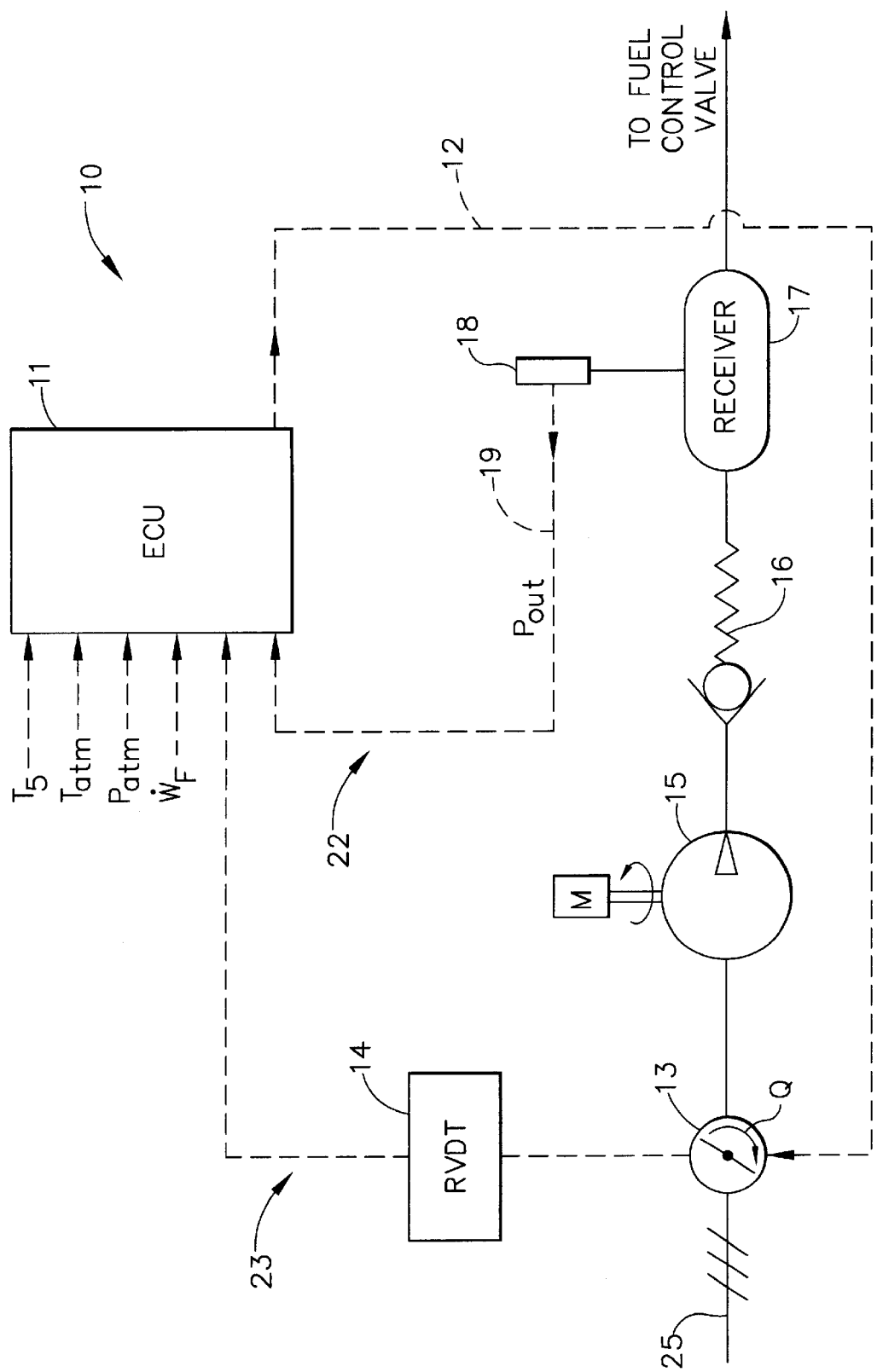
FIG. 1 is a schematic diagram of a control system for controlling a gas booster according to an embodiment of the present invention.

FIG. 1 schematically depicts a control system 10 for controlling or modulating the output pressure of a gas booster 15. In general, and unlike past designs that control pressure downstream of the gas booster, the present invention achieves modulation and control at a point upstream of or at the gas booster 15, as further described below. One feedback signal loop 22, and optionally a second feedback signal loop 23, enable the modulation.

More specifically, the control system 10 includes an engine control unit (ECU) 11 that may comprise a turbine engine control unit when used in the application of a turbine engine fuel delivery system. The engine control unit 11 includes a central processing unit of any well-known design that can compute and compare various parameters.

The ECU 11 can compute a reference discharge pressure that is based on parameters such as ambient pressure, ambient temperature, load condition, inlet valve gas pressure, and recuperator gas temperature. "Ambient pressure" identified in FIG. 1 as $P_{atm}$ refers to the pressure surrounding the system 10 which may typically vary between about 10.1 to 14.7 psia, while "ambient temperature" denoted as $T_{atm}$ refers to the temperature surrounding the system 10 and may typically vary between about −20 to 120° F. "Load condition" denoted as $W_f$ refers to the fuel flow rate from the system 10 to a control valve (not shown) upstream of a turbine (not shown). The flow rate may oftentimes range between 5 and 60 lbm/hr of natural gas. "Inlet valve gas pressure" refers to the pressure entering an effective suction flow area 13 upstream of or at the gas booster 15, as further described below. Such pressure may typically vary between 0.25 to 15 psig. Recuperator gas temperature denoted as $T_5$ refers to the gas exit temperature from a recuperator (not shown) that may be utilized in conjunction with a turbine, as well known in the art.

With some or all of the above parameters, as well as others, the ECU 11 may compute the reference discharge pressure. Accordingly, the particular reference discharge pressure represents an optimum discharge pressure that may vary depending upon the desired application and preferences of the user. As such, the particular calculation used to compute the reference discharge pressure may vary.

Figure 2:
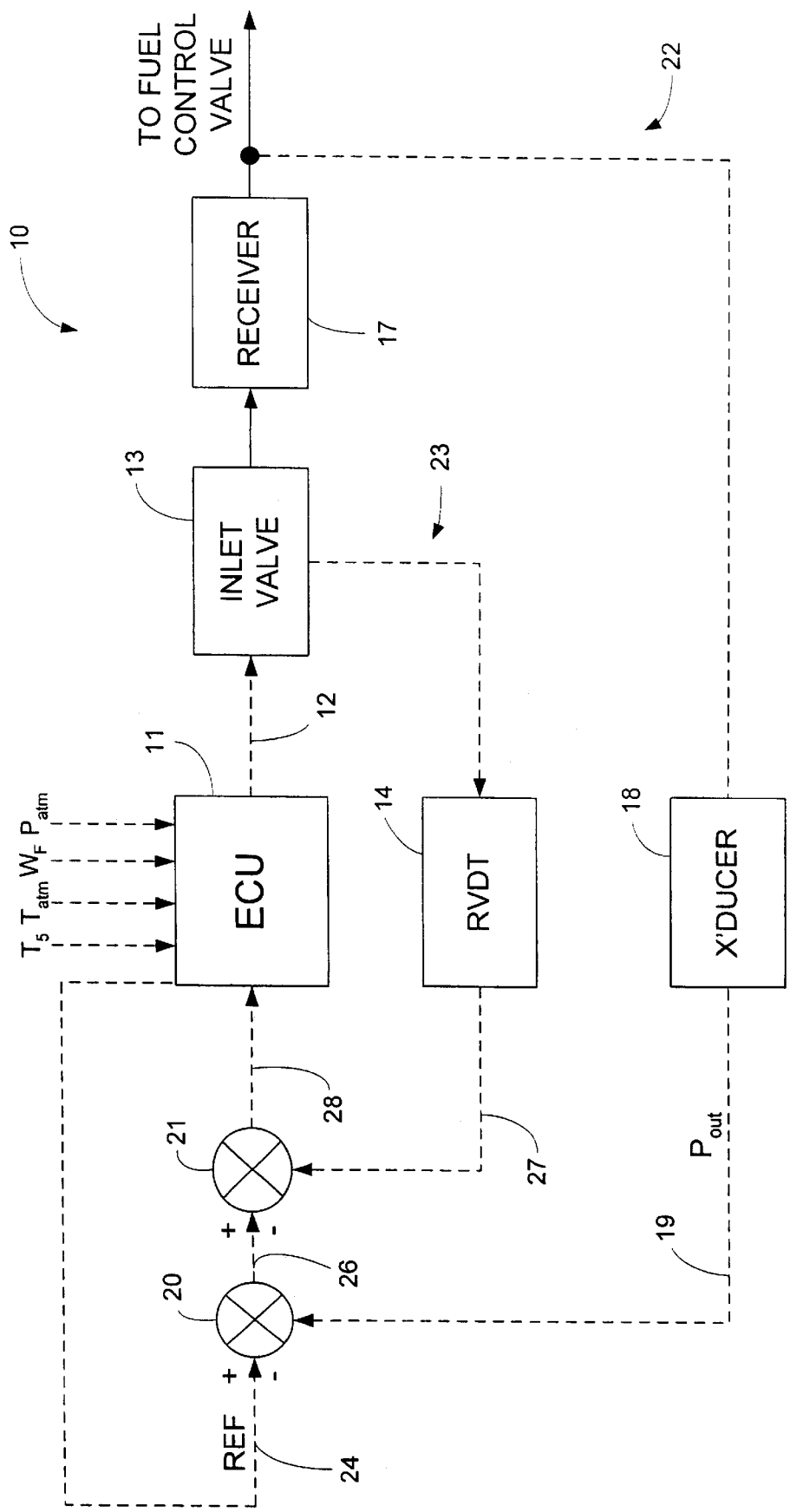
FIG. 2 is a schematic diagram of two feedback loops that are a part of the control system shown in FIG. 1.

Upon computing the reference discharge pressure, the ECU 11 is able to compare the reference discharge pressure to an actual discharge pressure signal 19 derived from the gas booster 15, as described below. Upon the ECU 11 making such comparison, a correcting signal 12 may be generated by the ECU 11 and sent into the first signal loop 22 (FIG. 2).

The first signal loop 22 comprises the ECU 11, an effective suction flow area 13, the gas booster 15, a receiver 17 of the gas booster 15, a transducer 18, a first summing junction 20, and optionally a second summing junction 21 which is part of the second signal loop 23 described below. In FIG. 1, the effective suction flow area 13 is shown as being upstream of the gas booster 15. However, the suction flow area 13 may alternatively be disposed at or be a part of the gas booster 15. In any event, the effective suction flow area 13 controls the effective gas flow into the gas booster 15. Accordingly, the effective suction flow area 13 may comprise an inlet valve and, more specifically, an electro-pneumatic valve. Irrespective of the specific means used, the effective suction flow area 13 receives the correcting signal 12. In response, the effective suction flow area 13 is adjusted by increasing or decreasing the flow through the area 13.

Upon the effective suction flow area 13 being adjusted, an effective amount of a gas 25 is flowed from a gas source (not shown), such as a facility or site supply, through the flow area 13, and to the gas booster 15. The gas booster 15 can be of any well-known design and may be motor-driven. Preferably, however, the gas booster 15 is of a positive displacement type. From the gas booster 15, the gas 25 is flowed to a check valve 16 that is of any well-known design that can maintain high pressure in the receiver 17. From the check valve 16, the pressurized gas flows to the receiver 17 that is also of any well-known design that can direct the gas 25 to both the control valve and transducer 18 mentioned above.

The receiver 17 transmits pressure to the transducer 18 that converts the pressure into the actual discharge pressure signal 19 mentioned above and denoted $P_{out}$ in FIGS. 1 and 2. The actual discharge pressure signal 19 is then sent to first summing junction or logic 20. The first summing junction 20 compares the actual discharge pressure signal 19 to a reference or target discharge pressure signal 24 that is generated by ECU 11 according to the above calculations. The first junction 20 generates and sends a first comparison signal 26 directly to the ECU 11 or indirectly to the ECU 11 via a second summing junction or logic 21 when the optional second signal loop 23 is utilized. When the second signal loop 23 is utilized, the second junction 21 compares the first comparison signal 26 to a position signal 27 from a transformer 14, further described below. The second junction 21 then generates and sends a second comparison signal 28 to the ECU 11. Thereby, the actual discharge pressure signal is effectively received by the ECU 11 for comparison with the computed reference discharge pressure described above.

In the embodiment where the second signal loop 23 is not utilized, the ECU 11 may generate the correcting signal 12 in the absence of data indicating the actual suction flow area 13. Instead, the ECU 11 sends the correcting signal 12 based on previously programmed characteristics of the effective suction flow area or valve 13. That is, the effective suction flow area 13 as a function of valve command is known and recognized by the ECU 11. Where the second signal loop 23 mentioned above is utilized, the actual suction flow area 13 is monitored and controlled by the second feedback loop 23.

The second loop 23 comprises the ECU 11, the effective suction flow area 13, a transformer 14, and the second summing junction 21. From the ECU 11, the correcting signal 12 is transmitted to the effective suction flow area 13 and then to the transformer 14. The transformer 14 serves to transform a position of the effective suction flow area 13 that adjusts flow rate, such as a radial or linear position, to the position signal 27 identified above. Accordingly, the transformer can be of various designs, such as radial variable differential transformer, linear variable differential transformer, or even proximity probes. The transformer 14 provides the position signal 27 to the second junction 21 which then compares such signal 27 to the first comparison signal 26, as described above.

By virtue of the first feedback signal loop 22, and optionally the second feedback signal loop 23, the ECU 11 may continuously compare the actual discharge pressure from the gas booster 15 to a target discharge pressure, and the effective suction flow area 13 may be continuously modulated for optimum gas delivery to the booster 15. In other words, power is saved by limiting the suction flow when the system 10 requirements permit limited suction flow. Where the gas booster 15 is a constant volumetric device, as an example, power consumption is a function of two factors— pressure ratio across the booster system and throughput flow rate. Pressure ratio, a well-defined booster parameter, is the ratio (in absolute units) of the discharge pressure to the suction pressure. Thus, if a compressor that provides the compressed gas to the booster 15 only compresses the amount of gas needed to maintain the desired discharge pressure, the throughput flow rate is reduced. In turn, power savings results.

More specifically, the first feedback signal loop 22 and optionally the second feedback signal loop 23 allow the receiver 17 to be unloaded or pre-loaded to an optimized pressure in anticipation of load changes. In other words, if the turbine is undergoing a part load and it is anticipated that the load will be increased, the pressure to the receiver 17 can be increased. Likewise, if the turbine is undergoing a large load and it is anticipated that the load will be reduced, the pressure to the receiver 17 can be reduced.

As an example, if the load condition is determined to be low (such as 10–15 kW for a 75 kW turbine engine), then the fuel flow rate is also low (such as 20–25 lbm/hr of natural gas). Subsequently, the turbine engine can "set up" for an ascending load change that arrives at the maximum load of 75 kW. To "set up," the ECU 11 would command the effective suction flow area 13 to increase its opening, allowing the gas booster discharge pressure to climb to a desired pressure (such as to 120 psig). Once the desired pressure is reached, the ECU 11 would command the flow area 13 to close. The result would be "pre-loading" the gas booster receiver 17 in anticipation of the ascending load change. When the ascending load change occurs, the receiver 17 is sufficiently preloaded to satisfy the fuel demand.

Conversely, if the load condition is determined to be high (such as 75 kW for a 75 kW turbine engine), then the fuel flow rate is also high (such as 40–45 lbm/hr of natural gas). Subsequently, the turbine engine can trim the gas booster discharge pressure for the prevailing conditions. The ECU 11 would command the effective suction flow area 13 to close, trimming the gas booster receiver 17 to a discharge pressure no higher than required to sustain the fuel flow demand (such as about 75 psig). The result is "unloading" of the gas booster 15 for energy savings. In other words, only the minimum amount of energy required to deliver the fuel is put into compressing the gas. If a descending load change occurs which does not require higher pressure, the receiver 17 can readily match the fuel demand.

For those skilled in the art, it can be seen that the present invention provides an apparatus and method of regulating the gas delivered to a gas booster. Also provided is an apparatus and method of fuel control upstream of or at the gas booster to provide booster suction control. The apparatus and method of the present invention improves the efficiency of a gas booster by employing a feedback signal to regulate the delivery of gas to the booster.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. In addition, benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method of controlling a gas booster, comprising:
   providing a first signal loop that includes an engine control unit and said gas booster, said first signal loop generating a pressure signal; and
   comparing said pressure signal with a reference discharge pressure; and
   generating a correcting signal from the step of comparing to control a flow of gas to said gas booster.

2. The method of claim 1, further comprising providing a second signal loop that includes said engine control unit and an effective suction flow valve of said gas booster, said second signal loop providing a position signal to said engine control unit.

3. The method of claim 1, further comprising computing discharge pressure by said engine control unit.

4. The method of claim 3, further comprising sending said correcting signal from said engine control unit to an effective suction flow valve of said gas booster in response to the step of comparing.

5. The method of claim 4, fixer comprising altering said pressure signal in response to said correcting signal.

6. The method of claim 5, wherein said effective suction flow valve comprises an inlet valve.

7. A method of controlling a gas booster, comprising:
   computing a reference discharge pressure for said gas booster;
   comparing an actual discharge pressure of said gas booster with said reference discharge pressure;
   generating a correcting signal derived from the step of comparing; and
   sending said correcting signal to an effective suction flow valve in flow communication with said gas booster.

8. The method of claim 7, further comprising adjusting said effective suction flow valve in response to said correcting signal.

9. The method of claim 7, further comprising adjusting said actual discharge pressure in response to said correcting signal.

10. The method of claim 9, wherein adjusting said actual discharge pressure includes one of unloading and pre-loading said gas booster.

11. The method of claim 7, further comprising providing a first signal feedback loop that includes said gas booster and an engine control unit, wherein said engine control unit computes said reference discharge pressure.

12. The method of claim 7, further comprising providing a second signal feedback loop that includes said effective suction flow valve and an engine control unit that computes said reference discharge pressure.

13. The method of claim 7, wherein said reference discharge pressure comprises a computation of ambient pressure, ambient temperature, load condition and effective suction flow valve gas pressure.

14. The method of claim 7, wherein said effective suction flow valve comprises an inlet valve.

15. A method of controlling a gas booster, comprising:
   computing in an engine control unit a reference discharge pressure for said gas booster,
   comparing in said engine control unit an actual discharge pressure of said gas booster and said reference discharge pressure;
   generating from said He control unit a correcting signal derived from the step of comparing;
   sending from sad engine control unit said coring signal to an inlet valve in flow communication with said gas booster; and
   adjusting said inlet valve in response to said correcting signal.

16. The method of claim 15, further comprising looping said correcting signal through said inlet valve and engine control unit.

17. The method of claim 15, further comprising looping a pressure signal through a receiver of said gas booster and said engine control unit.

18. The method of claim 15, further including one of unloading and pre-loading said gas booster.

19. The method of claim 18, wherein unloading said gas booster comprises reducing said actual discharge pressure.

20. The method of 18, wherein pre-loading said gas booster comprises increasing said actual discharge pressure.

* * * * *